United States Patent
Mougin et al.

(10) Patent No.: US 8,890,698 B2
(45) Date of Patent: Nov. 18, 2014

(54) DRAINAGE CIRCUIT FOR DRAINING LIQUID COMING FROM A POWER PLANT OF A ROTORCRAFT, THE CIRCUIT INCORPORATING AN APPLIANCE FOR MONITORING AN EXCESSIVE FLOW OF THE LIQUID

(71) Applicant: Airbus Helicopters, Marignane (FR)

(72) Inventors: Stephane Mougin, Rousset (FR); Jean-Sebastien Catteau, Aix En Provence (FR)

(73) Assignee: Airbus Helicopters, Marignane Cedex (FR)

( * ) Notice: Subject to any disclaimer, the term of this patent is extended or adjusted under 35 U.S.C. 154(b) by 116 days.

(21) Appl. No.: 13/753,658

(22) Filed: Jan. 30, 2013

(65) Prior Publication Data

US 2013/0201023 A1    Aug. 8, 2013

(30) Foreign Application Priority Data

Feb. 8, 2012    (FR) ..................................... 12 00375

(51) Int. Cl.
G08B 21/00    (2006.01)
G08B 21/18    (2006.01)
G01M 3/26    (2006.01)

(52) U.S. Cl.
CPC ............... *G08B 21/182* (2013.01); *G01M 3/26* (2013.01)
USPC ........... 340/618; 340/603; 340/605; 340/606; 73/40.7; 73/863.41; 73/31.05; 137/557; 137/558; 137/804; 137/805

(58) Field of Classification Search
USPC ......... 340/618, 626, 623, 616, 606, 603, 605; 73/40.7, 861.42, 863.41, 25.01, 31.05, 73/204.22, 29.01, 31.03, 202.5; 137/558, 137/557, 805, 804
See application file for complete search history.

(56) References Cited

U.S. PATENT DOCUMENTS 3,623,053 A * 11/1971 Meyer ........................... 137/558
3,630,644 A * 12/1971 Bellhouse et al. ............. 417/389
3,895,901 A *  7/1975 Swartz ............................ 431/77

(Continued)

FOREIGN PATENT DOCUMENTS

DE    29516718 U     1/1996
DE    10047586 A1    6/2002
JP    54160041 A    12/1979

OTHER PUBLICATIONS

Search Report and Written Opinion; Application No. FR 1200375; dated Oct. 25, 2012.

*Primary Examiner* — Hoi Lau
(74) *Attorney, Agent, or Firm* — Brooks Kushman P.C.

(57) ABSTRACT

The invention relates to a drainage circuit (4) for a flow of a liquid (5), the circuit being fitted with a monitoring appliance (13) for monitoring an excess flow rate of the liquid (5). The monitoring appliance (13) comprises a monitoring duct (14) interposed between an upstream duct (7) for collecting the liquid (5) and a downstream duct (9) for discharging the liquid (5). The monitoring duct (14) has retaining means (15) for retaining part of the liquid (5) inside a chamber (16) arranged to receive a spillway (22) of the captured liquid (19) in a reserve (20) fitted with indicator means (23) with a visual scale for providing warning information relating to the quantity of liquid (24) contained in the reserve (20).

21 Claims, 2 Drawing Sheets

(56) References Cited

U.S. PATENT DOCUMENTS

| | | | |
|---|---|---|---|
| 4,055,075 A * | 10/1977 | Allan et al. | 73/40.7 |
| 4,246,935 A * | 1/1981 | Mon | 137/840 |
| 4,267,857 A * | 5/1981 | van Haaften | 137/119.09 |
| 4,501,293 A * | 2/1985 | Furlong et al. | 137/557 |
| 4,508,014 A * | 4/1985 | Shoff | 91/527 |
| 4,617,970 A * | 10/1986 | Sivov | 137/805 |
| 4,769,701 A * | 9/1988 | Sklebitz et al. | 378/42 |
| 5,002,463 A * | 3/1991 | Breckner et al. | 417/20 |
| RE34,337 E * | 8/1993 | Bennett | 141/95 |
| 5,542,835 A * | 8/1996 | Kennedy et al. | 425/136 |
| 6,073,601 A * | 6/2000 | Guichard et al. | 123/184.55 |
| 6,871,534 B1 * | 3/2005 | Hamada et al. | 73/204.22 |
| 8,006,827 B2 * | 8/2011 | Aldred et al. | 198/638 |
| 8,024,982 B2 * | 9/2011 | Pettit et al. | 73/861.42 |
| 8,800,602 B2 * | 8/2014 | Al Shammary | 138/93 |
| 2008/0196479 A1 * | 8/2008 | Sahibzada | 73/31.05 |
| 2009/0064759 A1 * | 3/2009 | Pettit et al. | 73/25.01 |
| 2013/0160571 A1 * | 6/2013 | Williamson | 73/863.41 |
| 2013/0201023 A1 * | 8/2013 | Mougin et al. | 340/618 |

* cited by examiner

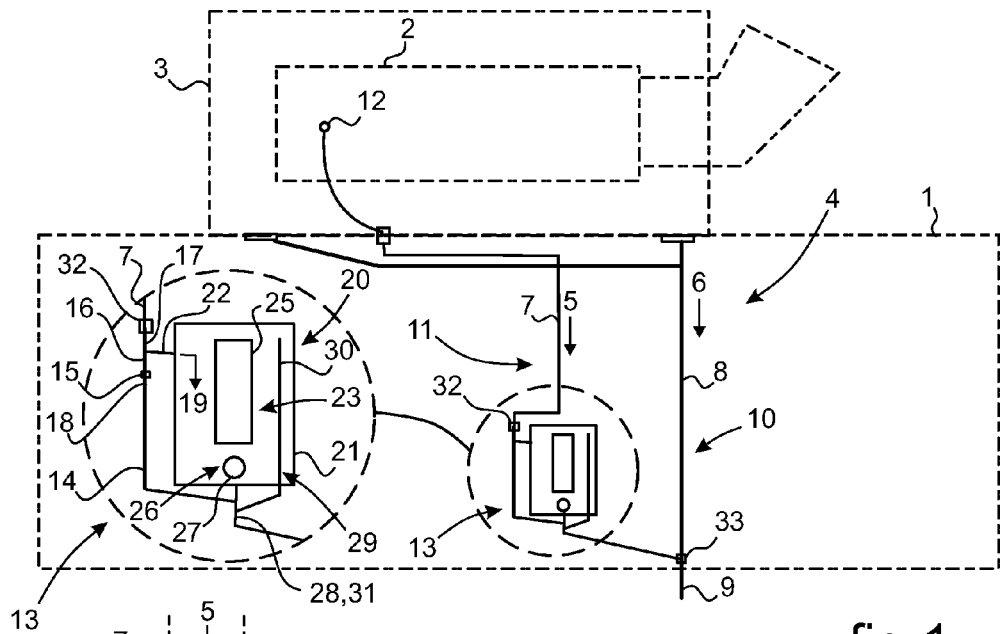
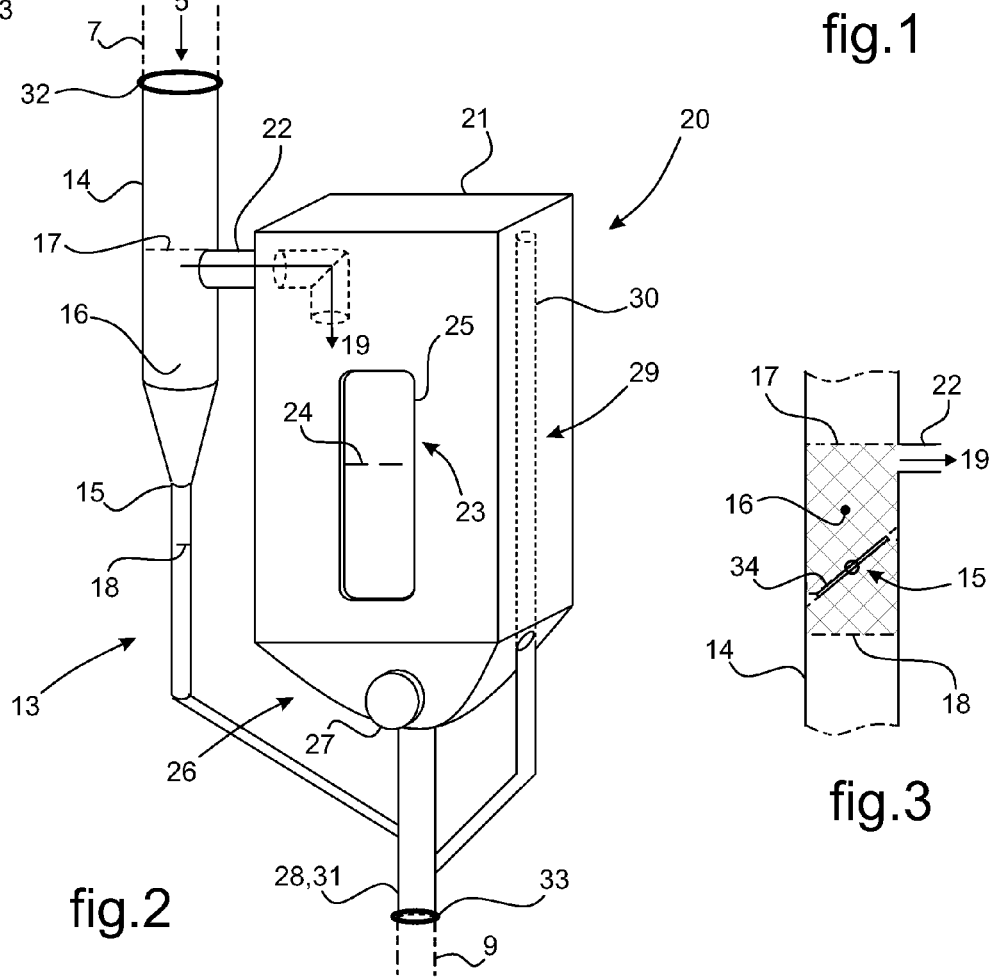

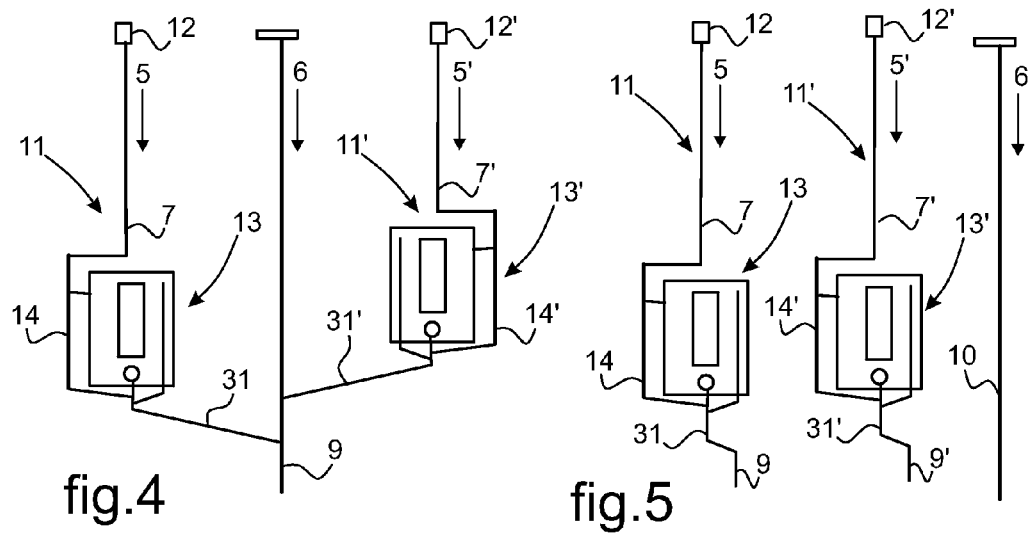
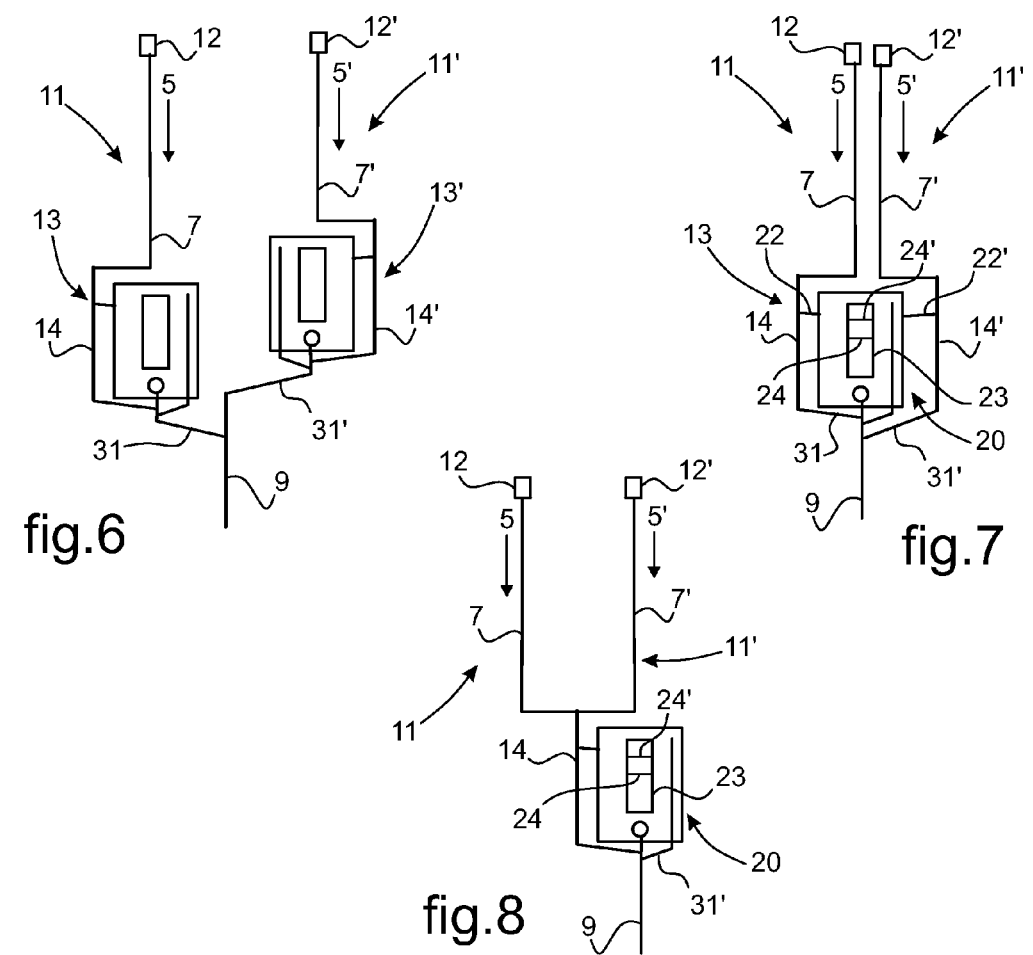

DRAINAGE CIRCUIT FOR DRAINING LIQUID COMING FROM A POWER PLANT OF A ROTORCRAFT, THE CIRCUIT INCORPORATING AN APPLIANCE FOR MONITORING AN EXCESSIVE FLOW OF THE LIQUID

CROSS REFERENCE TO RELATED APPLICATIONS

This application claims priority to French patent application No. FR 12 00375 filed on Feb. 8, 2012, the disclosure of which is incorporated in its entirety by reference herein.

BACKGROUND OF THE INVENTION (1) Field of the Invention

The present invention relates to the field of aircraft, and in particular rotorcraft, and it relates more particularly to on-board equipment for monitoring the operation of a power plant fitted to such an aircraft. The present invention relates more specifically to drainage circuits for a flow of at least one liquid coming from a power plant fitted to a rotorcraft, and leading to discharge to the outside environment.

(2) Description of Related Art

Rotorcraft are fitted with one or more power plants for driving rotation of at least one rotor, or indeed for driving at least one accessory of the rotorcraft. The power plant is generally installed in a compartment of the rotorcraft airframe. Such a compartment is commonly arranged in the top portion of the rotorcraft fuselage, close to the main rotor of the rotorcraft that serves to provide the rotorcraft with lift and possibly also propulsion.

Under such conditions, there arises the general problem of monitoring and maintaining the power plant. It is desirable to facilitate such monitoring as much as possible, including when performed by an inexperienced operator. Rotorcraft are commonly subjected to regular maintenance inspections that are complex and performed by a qualified operator, but it is also appropriate to allow a rotorcraft pilot to act quickly and easily at a stopover to monitor the operation of the power plant.

Power plants comprise a variety of members, such as for example a main engine for propelling the rotorcraft, cooling apparatus, a main gearbox, or any other member that incorporates and/or that is fitted with a circuit and/or a tank of liquid that is needed in its operation.

The leaktightness of members making use of a liquid, and analogously of any circuits associated with conveying the liquid, is not always perfect. This can lead to a leak of liquid that it is desirable to discharge to the environment outside the rotorcraft, in particular to avoid a potentially flammable liquid stagnating close to the power plant. It is also appropriate to monitor for the presence of any such liquid leak that is excessive, and this monitoring should be done regularly and it should be easy to do, in particular it should be possible for a rotorcraft pilot to do during a stopover or for any operator without special qualifications to do, and indeed it is also appropriate to generate a warning message in the event of any such excessive leak of liquid being detected.

It is conventional for rotorcraft to be fitted with a drainage circuit relying on natural flow of one or more liquids leaking from the power plant to the outside of the rotorcraft. Such a drainage circuit has one or more liquid flow ducts, including at least one downstream duct that leads to the environment outside the rotorcraft. Such a downstream duct may discharge to the outside environment not only the leakage liquid coming from at least one member of the power plant, but also runoff water that might be retained in the environment close to the power plant.

For example, a duct is interposed between the outside environment of the rotorcraft and a bottom wall of a compartment housing the power plant. All of the liquids that might be present in the compartment are collected and conveyed by the duct in order to be discharged to the outside. Said liquids are likely to be functional liquids that have leaked from members of the power plant, or else runoff water that has accumulated in the compartment as mentioned above.

Also by way of example, a drainage circuit comprises one or more individual drainage circuits, each having at least an upstream duct and a downstream duct. The upstream duct is in hydraulic communication at its upstream opening with a potential source of leakage liquid coming from the power plant, and at its downstream opening with the downstream duct. The liquid is conveyed by natural flow via the upstream duct and then via the downstream duct in order to be discharged to the outside.

In a first variant of an individual drainage circuit, a said upstream duct and a said downstream duct form an overall duct connecting an exclusive source of leakage liquid with the outside environment. The drainage circuit has a plurality of respective overall ducts allocated to draining various liquids coming from respective members of the power plant. The drainage circuit also has a specific duct for discharging runoff water, which duct is disposed between the outside environment and a bottom wall of a compartment housing the power plant.

In a second variant, the individual drainage circuit comprises an upstream duct leading to a downstream duct that is common to all of a plurality of individual circuits used for discharging liquids coming from potential sources of leakage liquid. The downstream duct is commonly formed by a downstream duct that includes a said duct for discharging runoff water.

Monitoring for a potential leak of a liquid can be performed using a device incorporated in the drainage circuit. Such a device may include a member for collecting a leakage liquid conveyed by the drainage circuit and associated with warning means for issuing a warning when a significant quantity of liquid has been collected in excess of a predefined threshold corresponding to a nominal flow that is acceptable for the leakage liquid.

For example, according to document U.S. Pat. No. 3,623, 053 (General Electric) a drainage duct for a leakage liquid in an aircraft is fitted with a warning device relating to a flow of a significant quantity of liquid in the duct that is considered as being excessive. The liquid may come from a fuel tank, or indeed from any functional member of the aircraft.

The device described in document U.S. Pat. No. 3,623,053 includes a liquid collector cup housed inside the duct. In its bottom, the cup has a liquid escape opening allowing the liquid to escape at an acceptable liquid flow rate. For a predetermined quantity of liquid collected inside the cup, means for detecting the predetermined quantity of liquid serve to generate a warning signal. The detector means use a probe formed by a tube for detecting the presence of liquid retained in the bottom of the receptacle, said probe being in communication with means for generating a warning signal.

Such a device for issuing a warning of an excessive flow of liquid in the duct needs to be improved.

By way of example, improvements need to be provided concerning the ways in which the device might be integrated in any drainage circuit and concerning the use of the device for any source of leakage liquid. The physicochemical characteristics of the liquid, and in particular its viscosity, and the flow rate of the liquid inside the drainage circuit are likely to differ significantly from one source to another.

By way of example, it is also desirable for the device to be suitable for being installed on any aircraft, taking account of the origin of the liquid, and at any location suitable for a drainage circuit operating by a natural flow of the liquid. The architecture of the drainage circuit may be of any kind and may be very varied from one aircraft to another.

Also by way of example it is appropriate to ensure that the information that might be generated by the warning means is reliable and to improve its pertinence, while also enabling it to be used by personnel having no specific qualification in aircraft maintenance, e.g. the pilot or personnel assisting the pilot.

Account should also be taken of the device being installed safely in the drainage circuit.

Account should also be taken of the competitivity of the device, meaning that costs should be kept down concerning the fabrication of the device, its incorporation and installation in a drainage circuit, its use, and its maintenance.

Technological background remote from the invention also includes the following documents: DE 295 16 718, JP 54 160041, and DE 100 47 586.

BRIEF SUMMARY OF THE INVENTION

The object of the present invention is to provide a drainage circuit operating by natural flow of a leakage liquid coming from a member fitted to an aircraft, and in particular a rotorcraft, the circuit incorporating a warning appliance for giving a warning of an excessive flow of the liquid within the drainage circuit. The drainage circuit of the present invention is more particularly arranged for discharging liquids to the outside of a rotorcraft, from the environment close to a power plant of the rotorcraft.

The present invention seeks more particularly to provide such a drainage circuit that provides the looked-for improvements and that provides a satisfactory compromise in terms of the above-mentioned constraints relating to monitoring for an excessive amount of liquid being conveyed by the drainage circuit.

The drainage circuit of the present invention is a circuit for draining a liquid by natural flow, the circuit being fitted with at least one monitoring device for monitoring for an excessive flow of the liquid. Such a liquid is in particular a leakage liquid coming from a member forming part of a power plant of an aircraft, and in particular a rotorcraft.

The drainage circuit has at least one upstream duct for collecting liquid, the upstream duct being in hydraulic communication with a downstream duct for discharging the liquid to the outside of the drainage circuit, and more particularly to the outside of the rotorcraft. Such a monitoring device makes use of at least one monitoring appliance that comprises at least one monitoring duct interposed between the upstream duct and the downstream duct. The monitoring duct is fitted with retaining means for retaining part of the liquid inside a chamber, for a liquid flow rate through the monitoring duct in excess of an acceptable threshold. The monitoring device also includes warning means for issuing a warning concerning a quantity of liquid captured by the retaining means.

According of the present invention, such a drainage circuit is recognizable mainly in that the chamber of the monitoring appliance is arranged to receive a spillway of the liquid captured by the retaining means into a reserve formed by a container outside the monitoring duct. The reserve is fitted with visual indicator means for indicating warning information relating to the quantity of liquid contained in the reserve.

Preferably, the indicator means are display means for displaying warning information constituted by a visual scale that is proportional to the quantity of liquid contained in the reserve.

In a method of using a drainage circuit of the present invention, the method comprises the following steps:

collecting excess liquid flowing by natural flow through a said monitoring duct inside a chamber, the chamber being provided by an upstream volume of said monitoring duct and said excess liquid being determined from the ability to prevent it from flowing naturally through the monitoring duct by using retaining means;

naturally and continuously spilling said excess liquid towards a said container outside the monitoring duct, the container being provided with said indicator means in which the indication is preferably proportional to the quantity of liquid received by the container as spilt from the chamber; and any person observing the warning information displayed by the indicator means to enable that person to determine a danger threshold relative to a previously established setpoint, the threshold corresponding to an excessive flow of the liquid inside the monitoring duct, on the basis of said person observing the quantity of liquid received by the container and displayed by the indicator means.

More particularly, the chamber is formed by an upstream volume of the monitoring duct defined by its section. The chamber is arranged in line with a downstream volume of the monitoring duct defined by its section. The retaining means are formed by restriction means for restricting the flow of the liquid between said upstream volume and said downstream volume dedicated to the flow of the liquid with a quantity corresponding to the acceptable threshold.

The volume of the chamber is immaterial, and the chamber may have any restricted volume. The chamber forms an intermediate volume between the monitoring duct and the reserve, and it may have any volume, advantageously being formed by the upstream volume of the monitoring duct above said retaining means. The inside volume of the monitoring duct is prevented from becoming congested significantly by the members of the monitoring appliance.

The restriction means may for example be formed by a constriction in the monitoring duct, the constriction being of a shape that corresponds to the quantity of liquid corresponding to said acceptable threshold by being adapted to the physicochemical characteristics of the liquid. Preferably, such a constriction is formed by a progressive reduction in the section of the monitoring duct between the upstream volume and the downstream volume, e.g. shaped as a cone or the like.

In a preferred embodiment, the restriction means are formed by an adjustable-flowrate retaining valve, e.g. a valve arranged as a swiveling valve member or the like. Preferably, the flow rate of the valve is rated in the workshop and is provided with means for preventing its flow rate from being modified by a non-authorized person.

Advantageously, the indicator means comprise a viewing window for viewing the quantity of liquid contained in the reserve.

In a possible embodiment, the indicator means comprise a display member incorporating a visual scale with implementation thereof depending on means for measuring the quantity of liquid contained in the reserve. By way of example, the visual scale is a scale of color variation and/or of variation in the brightness of light-emitting members forming part of the display member. By way of another example, the visual scale is a scale for variation in the position of a visible marker that is movable relative to a stationary graduated reference, or vice versa. By way of example, the measurement means may be a sensor of the pressure of the liquid contained in the reserve.

The reserve is provided with means for indicating when a liquid threshold has been reached inside the container. Such signaling means may be formed, for example, by a visual marker arranged on a window and corresponding to a said previously established setpoint.

Alternatively, the signaling means comprise at least one visual alarm member that can be installed on the instrument panel of an aircraft. The visual alarm member is in communication with said measurement means and serves to indicate at least one filling threshold of the container. The said filling threshold may correspond to an optimum filling threshold of the container that reveals a major operating fault of the member from which the liquid is collected by the drainage circuit, and/or may correspond to a filling threshold of the container that corresponds to said setpoint for inviting the pilot to inspect the indicator means.

The organization of the monitoring appliance of the present invention serves to diversify information relating to an excessive flow of liquid through the monitoring duct, thereby enabling a non-qualified person to verify visually the filling state of the reserve during a stopover, and possibly also to act in flight to warn such a person, in particular a pilot or the like, of the reserve being filled up to a said setpoint, so as to invite said person to visually inspect the filling level of the reserve.

In particular, the chamber and the container are in hydraulic communication with each other via a spillway interposed between the monitoring duct and the container.

Advantageously, the container is fitted with an emptying device for selectively emptying the container, which device comprises a discharge valve for discharging the liquid out from the container to an emptying duct in hydraulic communication with the downstream duct. The discharge valve may for example be arranged as a faucet or the like that can be operated by an operator.

Preferably, the container is fitted with an overflow discharge device comprising an overflow duct placed in the container and in hydraulic communication with the downstream duct. The upstream opening of the overflow duct is placed at an acceptable level of liquid inside the container, a downstream opening of the overflow duct leading to a hydraulic connection member of the overflow duct connecting it with the downstream duct.

Advantageously, the monitoring appliance is provided with a rejection duct for rejecting all of the liquid admitted into the monitoring duct. The said rejection duct is in hydraulic communication with the downstream duct, e.g. being formed by the emptying duct with the downstream end of the overflow duct and the downstream end of the monitoring duct opening out therein.

Preferably, the monitoring appliance is provided with reversible junction means for connecting the monitoring duct to the upstream duct, and for connecting the rejection duct to the downstream duct, in order to make the monitoring appliance easier to install on any drainage circuit, by being interposed between an upstream duct and a downstream duct forming parts of the drainage circuit. Such reversible junction means may for example be of the clamping collar type or of the type comprising respective collars engaged on the corresponding ducts and suitable for being axially assembled together, e.g. by bolts or by analogous assembly means.

A distinction is made between the chamber arranged with a spillway and suitable for being formed by the upstream volume of the monitoring duct, thereby enabling overall size to be limited and the structure of the monitoring duct to be simplified, and the reserve arranged outside the monitoring duct by being formed using a specific container fed with liquid spilling from the chamber via the spillway. Such a container is suitable for being fitted with said proportional indicator means concerning the quantity of liquid it contains, e.g. by using a said observation window for observing the content of the reserve.

An observer unqualified in aircraft maintenance, such as a crew member on a stopover or ground staff, can quickly obtain visual information, advantageously proportional information, relating to the quantity of liquid conveyed from the upstream duct to the downstream duct via the monitoring duct.

On the basis of this information observed by the operator, the operator can quickly decide before a flight of the aircraft on the pertinence of any potentially dangerous situation that might be induced by a leak of liquid that is found to be significant relative to a previously established setpoint for banning such flight and/or for ordering a maintenance operation on the source of leakage liquid.

The ability of the retaining means to capture excess liquid is easily adjustable as a function of the physicochemical characteristics of the liquid specifically admitted into the monitoring duct and as a function of a specific acceptable threshold for the flow of this liquid through the monitoring duct, without major structural modification to the monitoring duct and without making its structure more complex.

The monitoring duct associated with the reserve, or indeed associated with the various ducts included in the monitoring appliance, forms a mechanical assembly that is structurally simple and that operates by the natural effect of a liquid flowing under gravity.

The monitoring appliance may easily be added to a drainage circuit by being interposed between any upstream duct and any downstream duct. Such an addition can be performed easily at any location on the drainage circuit, with the location being freely chosen to enable such a non-qualified person to have rapid and easy access to visual information, advantageously proportional information, relating to the quantity of liquid contained in the reserve. Such an installation may be performed in particular by the monitoring appliance being easily engaged mechanically in the drainage circuit, firstly by means of a junction between the monitoring duct and the upstream duct, and secondly by means of a junction between the rejection duct and the downstream duct.

The structure of the monitoring appliance is potentially purely mechanical and its operation is induced solely by a natural effect relating:

to the retention of excess liquid inside the monitoring duct;

to the reserve being filled by spillage of said excess liquid to the container from the chamber;

to the warning information corresponding to the quantity of liquid contained in the reserve; and to the information transmitted by the warning means comprising a said window for viewing the quantity of liquid in excess collected by the container.

The monitoring appliance is reliable and the information is pertinent given said visually transmitted proportionality, while also being easily accessible during any stopover inspection of the monitoring device and also being easily understood by any person not specifically qualified in aircraft maintenance. The warning information is potentially usable for informing crew during a stopover of a variation in the flow rate of the liquid collected by the reserve between two stopovers, thus enabling said crew to judge the magnitude of the risk of danger induced by an excessive leak of liquid and such a variation in flow rate, by comparison with a said setpoint.

The monitoring appliance is easy to maintain, with respect:

to replacing the monitoring appliance in the event of a malfunction, the monitoring appliance being organized as a mechanical assembly that can be installed on the drainage circuit by a junction between mutually corresponding ducts;

to cleaning the monitoring duct in which the upstream volume and the downstream volume are arranged in line with each other; and to easy monitoring and emptying of the container enabling any quantity of liquid captured by the retaining means to be discharged quickly and easily.

The operation of the monitoring appliance is safe, since blockage or congestion of the monitoring duct is compensated by the captured liquid being discharged to the downstream duct via the container and the overflow duct. In the event of the monitoring duct being closed, thereby impeding or even preventing the liquid from flowing through it in the acceptable range below said acceptable threshold, the liquid can nevertheless flow between the upstream duct and the downstream duct through the monitoring appliance, and more particularly through the container and the rejection duct. An excessive quantity of liquid retained inside the monitoring duct is prevented as a result of it being discharged naturally by spillage towards the container, with such an excess quantity of liquid possibly generating significant volumes of vapor that lead to a lack of safety by being potentially conveyed through the upstream duct to the source of leakage liquid.

The distinction between the monitoring duct and the reserve makes it possible in particular to provide the monitoring appliance with a purge circuit for purging the monitoring duct in the event of it being congested by the liquid from the monitoring circuit. Such a purge circuit comprises in particular the spillway, the container, and the overflow duct, possibly extended by the rejection duct.

The drainage circuit of the present invention is more particularly organized to form a circuit for discharging to the outside of the rotorcraft at least one leakage liquid collected by the upstream duct from a power plant of the rotorcraft, or indeed from a fuel tank of a rotorcraft.

The predisposition of the drainage circuit of the present invention to monitoring a leakage liquid conveyed from a power plant of a rotorcraft and/or its nearby environment to the environment outside the rotorcraft, does not prejudice in any way other analogous applications that could be made thereof. The proposed structure for the drainage circuit of the present invention makes it easy to adapt to analogous other applications associated with monitoring the quantity of a liquid flowing through a drainage circuit and coming from a leakage source of said liquid from any member of any aircraft that might make use of such a liquid, such as for example monitoring a fuel tank for leakage.

The arrangement of the monitoring appliance makes it easy to install in a drainage circuit of a rotorcraft, with various potential ways of interposing it between a said upstream duct and a said downstream duct. The various ways described above of installing a monitoring appliance in the drainage circuit may be considered in isolation or in combination relative to the possibility of installing one or more monitoring appliances in the drainage circuit.

By way of example, a downstream duct may be a duct for draining runoff water. Such a drainage duct of runoff water is used in particular for collecting liquids that might stagnate in the environment close to the power plant, by being put into hydraulic communication with a compartment of the rotorcraft housing the power plant, the communication taking place via a bottom wall of the compartment.

It is nevertheless preferable to avoid mixing runoff water discharged to the outside with functional liquids that have the reputation of being polluting, by allocating at least one downstream duct that is specifically dedicated to external discharge of said leakage functional liquid.

More particularly, and in a preferred embodiment, a downstream duct is in hydraulic communication exclusively with at least one said monitoring appliance.

A said monitoring appliance is potentially in exclusive hydraulic communication with an upstream duct for collecting a specific liquid by a corresponding individual drainage circuit forming part of the drainage circuit. The drainage circuit comprises in particular a plurality of individual drainage circuits respectively allocated to draining a respective specific liquid from an upstream duct to a downstream duct, which ducts are specifically reserved for conveying that liquid.

In a possible embodiment, a monitoring appliance is in hydraulic communication with a plurality of upstream ducts for collecting respective liquids via corresponding individual drainage circuits of the drainage circuit.

A plurality of specific liquids may be spilled into the container. Under such circumstances, the indicator means are formed in particular by at least one said window enabling an operator to view the respective quantities of various specific liquids collected inside the container on the basis of their respective various appearances.

In various embodiments, putting the monitoring appliance into hydraulic communication with various upstream ducts may be performed equally well by means of:

a monitoring duct in hydraulic communication with at least one upstream duct of said plurality of upstream ducts; and/or a plurality of monitoring ducts in respective hydraulic communication with upstream ducts of said plurality; and/or individual reserves obtained by partitioning the container and individually in hydraulic communication with respective monitoring ducts via corresponding spillways, each of the individual reserves being fitted with its own individual indicator means that are respectively allocated thereto.

The concepts of upstream and downstream should be considered relative to the direction in which the liquid flows through the drainage circuit, through the various ducts making up the drainage circuit, and through the various ducts making up the monitoring appliance.

BRIEF DESCRIPTION OF THE SEVERAL VIEWS OF THE DRAWINGS

Embodiments of the present invention are described with reference to the figures of the accompanying sheets, in which:

FIG. 1 is a diagrammatic representation of a rotorcraft fitted with a drainage circuit of the present invention, in a simplified embodiment;

FIG. 2 is a perspective view of an embodiment of a monitoring appliance fitted to a drainage circuit of the present invention;

FIG. 3 is a view of an embodiment of retaining means fitted to a monitoring duct included in a monitoring appliance of the present invention; and FIGS. 4 to 8 are diagrams of various architectures for a drainage circuit of the present invention.

DETAILED DESCRIPTION OF THE INVENTION

In FIG. 1, a rotorcraft 1 is fitted with a power plant 2 housed in a compartment 3 of the rotorcraft 1. The rotorcraft 1 has a drainage circuit 4 for draining liquids 5, 6 under natural flow, the circuit comprising various ducts, including at least one upstream duct 7, 8 and at least one downstream duct 9.

The upstream duct(s) 7, 8 is/are for collecting and conveying liquids 5, 6 from the power plant 3 to a downstream duct 9 for discharging the collected liquids 5, 6 to the outside. An individual drainage circuit 10 is allocated to discharging runoff water 6 that might stagnate in the bottom of the compartment 3 housing the power plant 2. At least one other individual drainage circuit 11 is allocated to discharging a functional fluid 5 coming from a leaking liquid source 12, in particular from a member of the power plant 2.

The individual drainage circuit 11 allocated to discharging the functional liquid 5 is fitted with a monitoring appliance 13 for monitoring the quantity of liquid 5 that it conveys. The drainage circuit 4 may comprise a plurality of individual drainage circuits 11 for respective liquids 5, and it may be fitted with a monitoring device including a bank of monitoring appliances 13 allocated respectively to individually monitoring the various liquids 5 conveyed by the individual drainage circuits 11.

In FIGS. 1 and 2, the monitoring appliance 13 is interposed between a said upstream duct 7 and a said downstream duct 9. The monitoring appliance 13 comprises a monitoring duct 14 fitted with retaining means 15 for retaining the liquid 5 that it receives from the upstream duct 7. A fraction of the liquid 5 is captured by the retaining means 15 beyond some acceptable threshold for the flow of the liquid 5. Above such an acceptable threshold, it is considered that the quantity of liquid 5 conveyed by the upstream duct 7 reveals a malfunction of the leakage source 12 from which the liquid 5 comes.

Where applicable, the retaining means 15 capture a quantity of liquid 5 received by a chamber 16 formed by an upstream volume 17 of the monitoring duct 14. The upstream volume 17 is gravitationally above the retaining means 15 and in line with the downstream volume 18 of the monitoring duct 14 that receives the fraction of liquid 5 that is authorized with respect to said acceptable threshold. The chamber 16 is arranged to spill captive liquid 19 to a reserve 20 formed by a container 21 by means of a spillway 22 interposed between the monitoring duct 14 and the container 21.

The container 21 is fitted with indicator means 23 for indicating the quantity of liquid 24 that might possibly be contained in the reserve 20, thereby forming warning means concerning an excessive quantity of liquid 5 being conveyed from the upstream duct 7. The indicator means 23 are constituted in particular by a window 25 giving an operator visual access to the quantity of liquid 24 contained in the reserve 20. The operator may observe and access the magnitude of the leak of liquid 5 coming from the source 12, and also any consequences on the operation of the corresponding member of the power plant 3.

The container 21 is fitted with an emptying device 26 comprising a discharge valve 27 for discharging the liquid 24 out from the container 21 into an emptying duct 28 in hydraulic communication with the downstream duct 9. The container 21 is also fitted with an overflow discharge device 29 comprising an overflow duct 30 housed in the container 21. The overflow duct 30 and the monitoring duct 14 have their respective downstream ends leading to the discharge duct 28 for them to be put respectively into hydraulic communication with the downstream duct 9. The emptying duct 28 forms an overall rejection duct 31 for rejecting all of the liquid 5 admitted into the monitoring duct 14.

The monitoring appliance 13 is interposed between the upstream duct 7 and the downstream duct 9 via reversible junction means 32, 33, such as clamping collars or analogous members for establishing hydraulic communication between two ducts. Upstream junction means 32 provide hydraulic communication between the upstream duct 7 and the upstream end of the monitoring duct 14. Downstream junction means 33 establish hydraulic communication between the downstream end of the rejection duct 31 formed by the emptying duct 28 and the downstream duct 9.

In FIGS. 2 and 3, there can be seen respective embodiments of the retaining means 15.

In FIG. 2, the monitoring duct 14 includes a constriction arranged between the upstream volume 17 and the downstream volume 18 of the monitoring duct 14. This constriction is formed by progressively varying the section of the monitoring duct 14, e.g. by conically reducing its diameter.

In FIG. 3, the monitoring duct 14 is fitted with a retaining valve 34 for retaining the liquid 5 at a variable flow rate, the valve being interposed between the upstream volume 17 and the downstream volume 18 of the monitoring duct 14. In the embodiment shown, such a retaining valve 34 is formed by a valve member of variable position. The retaining valve 34 may be moved by an operator from outside the monitoring appliance 13, and more particularly from outside the container 21. By way of example, the retaining valve is moved by tilting the valve member so as to allow the liquid 5 to pass towards the downstream volume 18 at a rate corresponding to the acceptable threshold for the flow of the liquid 5 to the drainage circuit. A given monitoring appliance 13 can potentially be used for monitoring the flow of any liquid 5, merely by adapting the opening position of the retaining valve 34 to match the specific physicochemical characteristics of the liquid 5 being monitored and depending on the value of said acceptable threshold for a flow of the liquid 5 through the monitoring duct 14.

In FIG. 4, a plurality of individual drainage circuits 11, 11' are allocated to discharging the respective liquids 5, 5' they convey to the outside, said liquids 5, 5' coming from respective leakage sources 12, 12'. Each individual drainage circuit 11, 11' is fitted with a respective said monitoring appliance 13, 13' with the monitoring ducts 14, 14' being in hydraulic communication with respective upstream ducts 7, 7' and with the rejection ducts 31, 31' being in hydraulic communication with a common downstream duct 9. The downstream duct 9 may be formed by a downstream duct that is specific to discharging functional liquids or, as shown, it may be formed by a downstream duct of an individual drainage circuit 10 for runoff water.

In FIG. 5, one or more individual drainage circuits 11, 11' are dedicated respectively to draining functional liquids 5, 5', and each of them is fitted with a respective monitoring appliance 13, 13' allocated thereto. The monitoring ducts 14, 14' and the rejection ducts 31, 31' of each monitoring appliance 13, 13' are in hydraulic communication with a respective upstream duct 7, 7' and with a respective downstream duct 9, 9', which ducts are specific to each of the individual drainage circuits 11, 11'.

In FIG. 6, a plurality of individual drainage circuits 11, 11' have respective upstream ducts 7, 7' and respective monitoring appliances 13, 13', together with a common downstream duct 9. Such a downstream duct 9 is specific to these individual drainage circuits 11, 11' reserved for draining leaking functional liquids 5, 5'. The monitoring ducts 14, 14' of the monitoring appliances 13, 13' are in hydraulic communication with respective upstream ducts 7, 7'. The rejection ducts 31, 31' of the monitoring appliances 13, 13' are in hydraulic communication with a common downstream duct 9.

In FIGS. 7 and 8, a common monitoring appliance 13 is used for monitoring the flows of a variety of liquids 5, 5' coming from respective leakage sources 12, 12'. The information provided by the indicator means 23 relates to the respective quantities of the various liquids 24, 24' inside the reserve 20 of the monitoring appliance 13.

In FIG. 7, the various liquids 5, 5' are conveyed to respective monitoring ducts 14, 14' of the monitoring appliance 13. Spillways 22, 22' are allocated respectively to the various monitoring ducts 14, 14' in order to put them individually into hydraulic communication with a single reserve 20 of the monitoring appliance 13.

In FIG. 8, the monitoring duct 14 of the monitoring appliance 13 is in hydraulic communication with a plurality of upstream ducts 7, 7' included respectively in a plurality of individual drainage circuits 11, 11'.

What is claimed is:

1. A drainage circuit for passing a flow of a liquid, the circuit comprising at least one upstream duct for collecting the liquid in hydraulic communication with a downstream duct for discharging the liquid to outside the drainage circuit, the drainage circuit being fitted with at least one monitoring device for monitoring an excessive flow of liquid by implementing at least one monitoring appliance having at least one monitoring duct interposed between the upstream duct and the downstream duct and fitted with retaining means for retaining part of the liquid inside a chamber beyond an acceptable threshold for the flow of the liquid through the monitoring duct, the monitoring device including warning means concerning a quantity of liquid captured by the retaining means, wherein the chamber is arranged to receive a spillway of the liquid captured by the retaining means leading to a reserve formed by a container external to the monitoring circuit and fitted with indicator means for visually indicating warning information about the quantity of liquid contained in the reserve.

2. A drainage circuit according to claim 1, wherein the indicator means are display means for displaying warning information constituted by a visual scale that is proportional to the quantity of liquid contained in the reserve.

3. A drainage circuit according to claim 1, wherein the chamber is formed by an upstream volume of the monitoring duct defined by its section and arranged in line with a downstream volume of the monitoring duct defined by its section, the retaining means being formed by restriction means for restricting the flow of the liquid between said upstream volume and said downstream volume.

4. A drainage circuit according to claim 3, wherein the restriction means are formed by a constriction of the monitoring duct.

5. A drainage circuit according to claim 4, wherein the constriction is formed by a progressive reduction in the section of the monitoring duct between the upstream volume and the downstream volume.

6. A drainage circuit according to claim 3, wherein the restriction means are formed by a variable-flowrate retaining valve, the valve being rated and being provided with means for preventing its flow rate being modified by non-authorized personnel.

7. A drainage circuit according to claim 1, wherein the indicator means comprise a viewing window for viewing the quantity of liquid contained in the reserve.

8. A drainage circuit according to claim 1, wherein the indicator means comprise a display member incorporating a visual scale with implementation thereof depending on means for measuring the quantity of liquid contained in the reserve.

9. A drainage circuit according to claim 1, wherein the chamber and the container are in hydraulic communication with each other via a spillway interposed between the monitoring duct and the container.

10. A drainage circuit according to claim 1, wherein the container is fitted with an emptying device for selectively emptying the container, which device comprises a discharge valve for discharging the liquid out from the container to an emptying duct in hydraulic communication with the downstream duct.

11. A drainage circuit according to claim 1, wherein the container is fitted with an overflow discharge device comprising an overflow duct placed in the container and in hydraulic communication with the downstream duct.

12. A drainage circuit according to claim 11, wherein the monitoring device is provided with a purge circuit for purging the monitoring duct in the event of the monitoring duct comprising the spillway, the container, and the overflow duct becoming congested with the liquid.

13. A drainage circuit according to claim 1, wherein the monitoring appliance is provided with a rejection duct for rejecting all of the liquid admitted into the monitoring duct, said rejection duct being in hydraulic communication with the downstream duct.

14. A drainage circuit according to claim 13, wherein the rejection duct is formed by the emptying duct with the downstream end of the overflow duct and the downstream end of the monitoring duct opening out therein.

15. A drainage circuit according to claim 13, wherein the monitoring appliance is provided with reversible junction means for connecting the monitoring duct to the upstream duct, and for connecting the rejection duct to the downstream duct.

16. A drainage circuit according to claim 1, wherein the drainage circuit is a circuit for discharging to the outside at least one leakage liquid selected by the upstream duct from a power plant of a rotorcraft.

17. A drainage circuit according to claim 16, wherein a said downstream duct is a drainage duct for runoff water.

18. A drainage circuit according to claim 16, wherein a said downstream duct is in exclusive hydraulic communication with at least one said monitoring appliance.

19. A drainage circuit according to claim 16, wherein a said monitoring appliance is in exclusive hydraulic communication with an upstream duct for collecting a specific liquid by a corresponding individual drainage circuit forming part of the drainage circuit.

20. A drainage circuit according to claim 16, wherein a said monitoring appliance is in hydraulic communication with a plurality of upstream ducts for collecting respective liquids by corresponding individual drainage circuits of the drainage circuit.

21. A drainage circuit according to claim 1, wherein the drainage circuit is a circuit for discharging to the outside at least one leakage liquid collected by the upstream duct from a fuel tank of a rotorcraft.

* * * * *